(12) United States Patent
Huang et al.

(10) Patent No.: US 6,602,964 B2
(45) Date of Patent: Aug. 5, 2003

(54) REACTIVE DILUENT IN MOISTURE CURABLE SYSTEM

(75) Inventors: Misty Huang, New City, NY (US); Richard E. Handel, Tuckahoe, NY (US); Herbert Petty, Bethel, CT (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 10/061,329

(22) Filed: Feb. 4, 2002

(65) Prior Publication Data

US 2002/0115811 A1 Aug. 22, 2002

Related U.S. Application Data

(63) Continuation-in-part of application No. 09/445,080, filed on Dec. 2, 1999, now Pat. No. 6,395,856, which is a continuation-in-part of application No. 09/266,500, filed on Mar. 11, 1999, now Pat. No. 6,323,277, which is a continuation-in-part of application No. 09/062,047, filed on Apr. 17, 1998, now Pat. No. 6,140,445, and a continuation-in-part of application No. PCT/US98/17391, filed on Aug. 21, 1998.

(60) Provisional application No. 60/276,487, filed on Mar. 19, 2001.

(51) Int. Cl.$^7$ .................. C08G 77/04; C08G 77/08; C08G 77/38

(52) U.S. Cl. .................. 525/477; 525/476; 525/100; 525/101; 525/102; 525/103; 525/105; 525/106; 524/588; 524/858; 524/860; 524/862; 524/863; 528/15; 528/18; 528/28; 528/29; 528/31; 528/33; 528/35; 556/450

(58) Field of Search .................. 556/450; 524/588, 524/858, 860, 862, 863; 528/15, 18, 31, 33, 35, 28, 29; 525/476, 477, 100, 101, 102, 103, 105, 106; 522/99

(56) References Cited

U.S. PATENT DOCUMENTS

| | | | |
|---|---|---|---|
| 3,148,169 A | 9/1964 | Martens et al. .................. 260/41 |
| 3,702,783 A | 11/1972 | Hartlein ...................... 117/126 |
| 3,816,235 A | 6/1974 | Lin .............................. 161/175 |
| 3,944,707 A | 3/1976 | Foley et al. ................. 428/391 |
| 3,993,837 A | 11/1976 | Foley et al. ................. 428/391 |
| 4,049,865 A | 9/1977 | Maaghul ...................... 428/391 |
| 4,130,677 A | 12/1978 | Huntsberger ................ 427/379 |
| 4,179,537 A | 12/1979 | Rykowski .................... 427/387 |
| 4,550,056 A | 10/1985 | Pickwell et al. ............. 428/391 |
| 4,950,779 A | 8/1990 | Wengrovius et al. ........ 556/457 |
| 5,063,198 A | * 11/1991 | Imai et al. .................. 503/227 |
| 5,210,168 A | 5/1993 | Bergstrom et al. ............. 528/12 |
| 5,282,998 A | 2/1994 | Horn et al. ............. 252/182.14 |
| 5,527,936 A | 6/1996 | Dindi et al. ................ 556/479 |
| 5,530,152 A | 6/1996 | Dindi et al. ................ 556/479 |
| 5,543,173 A | * 8/1996 | Horn et al. ................. 427/212 |
| 5,840,800 A | * 11/1998 | Joffre et al. ................ 524/806 |
| 5,962,588 A | * 10/1999 | Iwamura et al. ............. 525/103 |
| 6,069,259 A | * 5/2000 | Crivello ....................... 549/214 |
| 6,140,445 A | 10/2000 | Su et al. ....................... 528/15 |
| 6,207,783 B1 | 3/2001 | Petty et al. .................... 528/33 |
| 6,310,170 B1 | 10/2001 | Johnston et al. ............. 528/38 |
| 6,323,277 B1 | 11/2001 | Petty et al. .................. 524/865 |
| 6,395,856 B1 | 5/2002 | Petty et al. .................... 528/24 |
| 6,437,071 B1 | * 8/2002 | Odaka et al. ................. 528/15 |

FOREIGN PATENT DOCUMENTS

| | | | | |
|---|---|---|---|---|
| EP | 890598 A1 | * | 1/1999 | ........... C08G/77/18 |
| WO | WO 96/16125 | * | 5/1996 | ........... C08L/83/06 |
| WO | 99/09036 | | 2/1999 | |

* cited by examiner

Primary Examiner—Robert Dawson
Assistant Examiner—Jeffrey B. Robertson
(74) Attorney, Agent, or Firm—Michael P. Dilworth (57) ABSTRACT

Disclosed herein is a composition comprising:

A) a moisture curable polymer selected from the group consisting of silylated polyurethanes, silylated polyethers, and mixtures thereof, and B) a silicone oligomer of the formula:

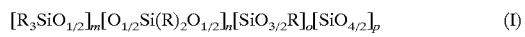

$$[R_3SiO_{1/2}]_m[O_{1/2}Si(R)_2O_{1/2}]_n[SiO_{3/2}R]_o[SiO_{4/2}]_p \qquad (I)$$

wherein:

each R is independently selected from the group consisting of B, $R^1$, —$OR^2$, $R^3$, and $R^4$;

B is an organosilyl functional group bridged to the Si atom of the siloxane oligomer backbone by a Si—C bond;

each $R^1$ is independently a saturated or aromatic hydrocarbon group of 1 to 16 carbon atoms;

each $R^2$ is independently a group as defined for $R^1$ or an acyl group;

each $R^3$ is independently a monovalent organic group containing an aliphatic unsaturated hydrocarbon group;

each $R^4$ is a monovalent organic group linked to the Si atom of the siloxane oligomer backbone by a Si—C bond that does not include an aliphatic unsaturated hydrocarbon group and that has thereon one or more members selected from the group consisting of ether polysulfide, ester, polyester, carbamate, polyurethane, isocyanurate, thioether, blocked mercaptan, amide, cyano, and oximato groups;

with the provisos that at least one R is a B, at least one quarter of all R groups are —$OR^2$, and at least one silicon atom of the oligomer has an $R^3$ group thereon;

m is 2 to 10; n is 0 to 20; o is 0 to 20; and p is 0 to 10.

30 Claims, 1 Drawing Sheet

Figure 1. Thermal Stability of the Cured Polyurethane (measured at 150°C)

REACTIVE DILUENT IN MOISTURE CURABLE SYSTEM

CROSS REFERENCE TO RELATED APPLICATIONS

We claim the benefit under Title 35, United States Code, §120 of U.S. Provisional Application No. 60/276,487, filed Mar. 19, 2001, entitled REACTIVE DILUENT IN MOISTURE CURABLE SYSTEM.

This application is also a continuation-in-part of co-pending application U.S. application Ser. No. 09/445,080, filed Dec. 2, 1999, now U.S. Pat. No. 6,395,856, which is a continuation-in-part of U.S. application Ser. No. 09/266,500, filed Mar. 11, 1999, now U.S. Pat. No. 6,323,277, which is a continuation-in-part of U.S. application Ser. No. 09/062,047, filed Apr. 17, 1998, now U.S. Pat. No. 6,140,445, and a continuation-in-part of PCT/US98/17391, filed Aug. 21, 1998, designating the U.S.

BACKGROUND OF THE INVENTION

1. Field of the Invention

This invention relates to silicone oligomers useful as reactive diluents for curable polymer systems, for example, silylated polyurethanes, silylated polyethers, or mixtures thereof. These systems may be used for either high modulus sealants in automotive applications or low viscosity formulations for coatings, adhesives and sealants.

2. Description of Related Art

It is known in the art to treat fillers or reinforcing agents to improve the physical or mechanical properties of plastics, resins, or rubbers reinforced with the filler. Much of the research in this area has centered on the pretreatment of glass fiber reinforcement materials for resins and rubbers. For example, U.S. Pat. No. 3,702,783 describes the application as a size to glass fibers of a blend of 3-glycidoxypropyltri ethoxysilane and methyltrimethoxysilane. U.S. Pat. No. 3,816,235 discloses a size composition for the treatment of glass fibers wherein the size composition contains a blend of aminoalkyltriethoxysilane and methyltriethoxysilane. U.S. Pat. No. 3,944,707 discloses the use as a size for glass fiber reinforcement for plastics, blends of vinyl silane or vinyl siloxanes and a beta-haloalkoxysilane. Similarly, U.S. Pat. No. 3,993,837 discloses glass fiber size compositions containing blends of epoxyalkylsilane or siloxane and a beta-haloalkoxysilane.

U.S. Pat. No. 3,148,169, discloses the pretreatment of clay filler with a silicone fluid to coat the clay particles to impart a hydrophobic character to the clay and to mask the acidic nature of the clay so that peroxides later used as cross-linking agents are not deactivated.

U.S. Pat. No. 4,049,865 discloses glass fiber size compositions containing a blend of an aminoalkylsilane and a vinyl silane.

U.S. Pat. No. 4,130,677 discloses the sizing of glass bottle surfaces with an aminoalkylsilane.

U.S. Pat. No. 4,179,537, discloses blends of an organofunctional silane, e.g., vinyltrialkoxysilanes, methacryloxyalkyltrialkoxysilanes, vinyltrihalosilanes and the like with a non-organofunctional silane, e.g., alkyltrialkoxysilanes, and the incorporation of such blends into organic resins, e.g., EPDM rubber for improving the adhesion between inorganic substrates, such as clay fillers and the resin. This patent suggests that the presence of siloxane oligomers in the resin-filler system could have a detrimental effect on coupling efficiency (col. 4, lines 54–63). The use of silanes having silicon-bonded 2-methoxyethoxy groups as coupling agents, e.g., vinyl-tris-(2-methoxyethoxy)silane (col. 2, lines 44–47) is also described in U.S. Pat. No. 4,179,537. Vinyl-tris-(2-methoxyethoxy)silane, has been used industrially for many years as a coupling additive in mineral-filled EPM and EPDM wire and cable insulations. EPM is an ASTM designation for copolymers of ethylene and propylene; EPDM is a terpolymer of ethylene, propylene, and a diene monomer, such as ethylidene norbornene or 1,4 hexadiene. Vinyl-tris-(2-methoxyethoxy)silane has been extensively used heretofore because it provides a unique balance of elastomer reinforcement and the degree of wet electrical stability required. However, it releases 2-methoxyethanol as a hydrolysis by-product when it is used and, unfortunately, 2-methoxyethanol is now being studied as a suspected teratogen. Consequently, coupling agent products based on vinyl-tris-(2-methoxyethoxy)silane are now facing continuing replacement pressure in the marketplace.

U.S. Pat. No. 4,550,056, describes electrical cables comprising a conductor and a coating of insulation on the conductor, the coating comprising a cured composition of
(1) an organic elastomer;
(2) an inorganic filler;
(3) a coupling composition comprising (a) an ethylenically unsaturated silane, having bonded to silicon, at least one hydroxy group and/or alkoxy group; (b) a methyl ethoxy siloxane oligomer fluid; and (c) a methyl vinyl siloxane oligomer fluid.

Commercial products used as coupling agents in elastomer/filler compositions include cohydrolysis products of dimethyl and vinylmethylchlorosilanes, which are used as a filler hydrophobe treatment on calcined clays. Such products, however, have a relatively high cost owing to the high cost of vinylmethyldichlorosilane.

U.S. Pat. No. 4,950,779 describes mixtures comprising cyclic, linear, and branched alkoxy functional silicone oligomers produced by condensation of organotrialkoxysilanes, such as methyltrimethoxysilane and vinyltrimethoxysilane, using formic acid, optionally with a strong acid catalyst.

U.S. Pat. No. 5,210,168 describes alkoxy functional silicone oligomer mixtures produced from organotrialkoxysilanes using a carboxylic acid, such as formic acid, and a strong acid catalyst.

U.S. Pat. No. 5,282,998 describes mixtures of linear and cyclic alkoxy functional silicone oligomers produced from vinyltrialkoxysilanes using hydrogen chloride catalyst and water.

U.S. Pat. No. 6,140,445 describes novel alkoxy functional silicone oligomers having alkoxysilylalkyl substituents on a backbone silicon atom. Such oligomers may be produced from vinylalkoxysiloxane oligomers by hydrosilation with an alkoxyhydridosilane, by hydrosilating a vinylalkoxysilane with a hydridoalkoxy silicone oligomer, or by condensation of a bis-alkoxysilane having silicon atoms joined by other than an Si—O bond, optionally with other alkoxysilanes. Such oligomers are disclosed to be useful as coatings or adhesives, or additives therefor.

U.S. Pat. No. 6,207,783 discloses an oligomer of the formula:

$$[R_3SiO_{1/2}]_m[O_{1/2}Si(R)_2O_{1/2}]_n[SiO_{3/2}R]_o[SiO_{4/2}]_p \qquad (I)$$

wherein each R is selected individually from the group consisting of $R^1$, $-OR^2$, and $-OR^3$; each $R^1$ is independently a substituted or unsubstituted hydrocarbon group; each $R^2$ is independently a $C_1$–$C_6$ alkyl group as defined for $R^1$ or an acyl group; and each $R^3$ is independently an alkyl or alkenyl group having at least 8 carbon atoms; with the provisos that if $R^3$ is alkenyl, there is no unsaturation with two carbon atoms adjacent to the oxygen atom or the —$OR^3$ group; at least one R group is —$OR^3$; at least one quarter of all R groups are —$OR^2$ or —$OR^3$; m=2 to 20; n=0 to 50; o=0 to 20; and p=0 to 10. The oligomer is a useful component of insulation formulations for wire and cable used in underground locations.

U.S. Pat. No. 6,310,170 discloses compositions comprising a silylated polymer and an adhesion promoter, the silylated polymer having an inorganic or organic backbone and at least two groups thereon selected from alkoxysilyl, aryloxysilyl, alkyloximinosilyl, and silanol groups and the adhesion promoter being a silane adhesion promoter of the formula:

$R^1$ is a branched or cyclic alkylene group, an arylene group or an alkarylene group, any of which may be optionally interrupted by one or more ether oxygen atoms or a (poly) sulfide bridge, provided that $R^1$ has at least 4 carbon atoms; $R^2$ is an alkyl, aryl or alkaryl radical having 1 to 6 carbons; $R^3$ is a $C_1$ to $C_6$ alkoxy group or a $C_3$ to $C_5$ ketoximato group; $R^4$ is hydrogen, a hydrocarbon group, which may optionally be substituted, or a group which will thermally deblock to form an amine group containing the nitrogen atom to which it is attached; and z is 0 or 1.

U.S. Pat. No. 6,323,277 discloses oligomers of the formula:

$$[R_3SiO_{1/2}]_m[O_{1/2}Si(R)_2O_{1/2}]_n[SiO_{3/2}R]_o[SiO_{4/2}]_p \quad (I)$$

wherein each R is selected individually from the group consisting of B, $R^1$, —$OR^2$, $R^3$ and $R^4$; B is an organosilyl functional group bridged to the Si atom of the siloxane oligomer backbone by an Si—C bond; each $R^1$ is independently a saturated or aromatic hydrocarbon group of 1 to 16 carbon atoms; each $R^2$ is independently a group as defined for $R^1$ or an acyl group; and each $R^3$ is independently a monovalent organic radical containing an aliphatically unsaturated hydrocarbon group and each $R^4$ is a monovalent organic radical linked to the Si atom of the siloxane oligomer backbone by an Si—C bond, which does not include an aliphatically unsaturated hydrocarbon group and which has thereon one or more members selected from the group consisting of ether, polyether, ester, polyester, carbamate, polyurethane, isocyanurate, thioether, polysulfide, blocked mercaptan, amide, cyano and oximato groups; with the provisos that at least one R is a B, at least one quarter of all R groups are —$OR^2$, and at least one silicon atom of the oligomer has an $R^3$ group thereon; m=2 to 10; n=0 to 20; o=0 to 20; and p=0 to 10, which are useful as coupling agents in curable compositions of filled organic polymers used for wire and cable insulation. The oligomers also have utility as cross-linkers, as adhesion promoters, to provide a dual radical/moisture cure mechanism, and/or to provide moisture resistance in coating, in other compositions, such as curable adhesives and coatings.

U.S. Pat. No. 6,395,856 discloses oligomers of the formula:

$$[R_3SiO_{1/2}]_m[O_{1/2}Si(R)_2O_{1/2}]_n[SiO_{3/2}R]_o[SiO_{4/2}]_p \quad (I)$$

wherein each R is selected individually from the group consisting of B, $R^1$, —$OR^2$, $R^3$ and $R^4$; B is an organosilyl functional group bridged to the Si atom of the siloxane oligomer backbone by an Si—C bond; each $R^1$ is independently a saturated aliphatic hydrocarbon group of 1 to 16 carbon atoms; each $R^2$ is independently a group as defined for $R^1$, an aromatic hydrocarbon group or an acyl group; each $R^3$ is independently a monovalent organic radical containing an aliphatically unsaturated hydrocarbon group and each $R^4$ is a monovalent organic radical linked to the Si atom of the siloxane oligomer backbone by an Si—C bond, which does not include an aliphatically unsaturated hydrocarbon group and which has thereon one or more members of the group selected from aromatic hydrocarbon, ether, ester, carbamate, thioether, polysulfide, blocked mercaptan, amide, epoxy, cyano and oximato groups; and with the provisos that at least one quarter of all R groups are —$OR^2$; either at least one silicon atom of the oligomer has an $R^3$ group thereon or at least one R is a B, or both; if there is a group $R^3$ which is a vinyl group, there is at least one other group which is a B group, an $R^3$ group other than vinyl, or an $R^4$ group; m=2 to 20; n=0 to 50; o=0 to 20; and p=0 to 10, are useful as coupling agents in curable compositions of filled organic polymers used for wire and cable insulation. The oligomers also have utility as crosslinkers, as adhesion promoters, to provide a dual radical/moisture cure mechanism, and/or to provide moisture resistance in coating, in other compositions, such as curable adhesives and coatings.

The disclosures of the foregoing are incorporated herein by reference in their entirety.

SUMMARY OF THE INVENTION

The present invention is directed to silicone oligomers similar to those disclosed in U.S. Pat. No. 6,395,856 and U.S. Pat. No. 6,323,277 characterized by having vinyl, mercapto, or other aliphatic or aromatic hydrocarbon functionality thereon, which are useful in certain cross-linkable organic polymer compositions, such as silylated prepolymers or conventional polyurethane prepolymers, for applications in coatings, adhesives, and sealants. The silicone oligomers useful in the practice of the present invention may be of the formula:

$$[R_3SiO_{1/2}]_m[O_{1/2}Si(R)_2O_{1/2}]_n[SiO_{3/2}R]_o[SiO_{4/2}]_p \quad (I)$$

wherein:

each R is selected individually from the group consisting of B, $R^1$, —$OR^2$, $R^3$, and $R^4$;

B is an organosilyl functional group bridged to the Si atom of the siloxane oligomer backbone by a Si—C bond;

each $R^1$ is independently a saturated or aromatic hydrocarbon group of 1 to 16 carbon atoms;

each $R^2$ is independently a group as defined for $R^1$ or an acyl group;

each $R^3$ is independently a monovalent organic group containing an aliphatic unsaturated hydrocarbon group;

each $R^4$ is a monovalent organic group linked to the Si atom of the siloxane oligomer backbone by a Si—C bond that does not include an aliphatic unsaturated hydrocarbon group and that has thereon one or more members selected from the group consisting of ether polysulfide, ester, polyester, carbamate, polyurethane, isocyanurate, thioether, blocked mercaptan, amide, cyano, and oximato groups;

with the provisos that at least one R is a B, at least one quarter of all R groups are —$OR^2$, and at least one silicon atom of the oligomer has an $R^3$ group thereon;

m is 2 to 10;
n is 0 to 20;
o is 0 to 20; and
p is 0 to 10.

In one aspect, the invention is directed to a curable composition comprising an oligomer of formula (I). Such compositions can be formed by mixing concurrently or in any order of succession:
1. an organic polymer curable by moisture;
2. a silicone oligomer as described above;
3. with or without one or more inorganic fillers, plasticisers, or other additives.

Preferred compositions also include a catalyst package capable of catalyzing silane condensation leading to the crosslinking of the organic polymer. Sealant and adhesive compositions that comprise the oligomers of formula (I) may also be prepared.

The silicone oligomers may be produced with little or no volatile material. They could be used as replacements for free isocyanates or organic solvents and used in coatings, adhesives, or sealants, thereby reducing health hazards and improving the products' mechanical properties and adhesion to difficult substrates.

More particularly, the present invention is directed to a composition comprising:
A) a moisture curable polymer selected from the group consisting of silylated polyurethanes, silylated polyethers, and mixtures thereof, and
B) a silicone oligomer of the formula:

(I)

wherein:
each R is independently selected from the group consisting of B, $R^1$, $-OR^2$, $R^3$, and $R^4$;
B is an organosilyl functional group bridged to the Si atom of the siloxane oligomer backbone by a Si—C bond;
each $R^1$ is independently a saturated or aromatic hydrocarbon group of 1 to 16 carbon atoms;
each $R^2$ is independently a group as defined for $R^1$ or an acyl group;
each $R^3$ is independently a monovalent organic group containing an aliphatic unsaturated hydrocarbon group;
each $R^4$ is a monovalent organic group linked to the Si atom of the siloxane oligomer backbone by a Si—C bond that does not include an aliphatic unsaturated hydrocarbon group and that has thereon one or more members selected from the group consisting of ether polysulfide, ester, polyester, carbamate, polyurethane, isocyanurate, thioether, blocked mercaptan, amide, cyano, and oximato groups;
with the provisos that at least one R is a B, at least one quarter of all R groups are $-OR^2$, and at least one silicon atom of the oligomer has an $R^3$ group thereon;
m is 2 to 10;
n is 0 to 20;
o is 0 to 20; and
p is 0 to 10.

In another aspect, the present invention is directed to an article of manufacture comprising a cured composition prepared from a composition comprising:
A) a moisture curable polymer selected from the group consisting of silylated polyurethanes, silylated polyethers, and mixtures thereof; and
B) a silicone oligomer of the formula:

(I)

wherein:
each R is independently selected from the group consisting of B, $R^1$, $-OR^2$, $R^3$, and $R^4$;
B is an organosilyl functional group bridged to the Si atom of the siloxane oligomer backbone by a Si—C bond;
each $R^1$ is independently a saturated or aromatic hydrocarbon group of 1 to 16 carbon atoms;
each $R^2$ is independently a group as defined for $R^1$ or an acyl group;
each $R^3$ is independently a monovalent organic group containing an aliphatic unsaturated hydrocarbon group;
each $R^4$ is a monovalent organic group linked to the Si atom of the siloxane oligomer backbone by a Si—C bond that does not include an aliphatic unsaturated hydrocarbon group and that has thereon one or more members selected from the group consisting of ether polysulfide, ester, polyester, carbamate, polyurethane, isocyanurate, thioether, blocked mercaptan, amide, cyano, and oximato groups;
with the provisos that at least one R is a B, at least one quarter of all R groups are $-OR^2$, and at least one silicon atom of the oligomer has an $R^3$ group thereon;
m is 2 to 10;
n is 0 to 20;
o is 0 to 20; and
p is 0 to 10.

In still another aspect, the present invention is directed to a method for the preparation of silylated polyurethanes comprising:
A) combining a silylated polyurethane prepolymer with a silicone oligomer of the formula:

(I)

wherein:
each R is independently selected from the group consisting of B, $R^1$, $-OR^2$, $R^3$, and $R^4$;
B is an organosilyl functional group bridged to the Si atom of the siloxane oligomer backbone by a Si—C bond;
each $R^1$ is independently a saturated or aromatic hydrocarbon group of 1 to 16 carbon atoms;
each $R^2$ is independently a group as defined for $R^1$ or an acyl group;
each $R^3$ is independently a monovalent organic group containing an aliphatic unsaturated hydrocarbon group;
each $R^4$ is a monovalent organic group linked to the Si atom of the siloxane oligomer backbone by a Si—C bond that does not include an aliphatic unsaturated hydrocarbon group and that has thereon one or more members selected from the group consisting of ether polysulfide, ester, polyester, carbamate, polyurethane, isocyanurate, thioether, blocked mercaptan, amide, cyano, and oximato groups;
with the provisos that at least one R is a B, at least one quarter of all R groups are $-OR^2$, and at least one silicon atom of the oligomer has an $R^3$ group thereon;
m is 2 to 10;
n is 0 to 20;

o is 0 to 20; and p is 0 to 10; and

B) curing by exposure to moisture.

DESCRIPTION OF THE PREFERRED EMBODIMENTS

In accordance with the present invention, silicone oligomers are used as reactive diluents in curable polymer systems, such as silylated polyurethanes, silylated polyethers, or mixtures thereof. These oligomers reduce viscosity of the prepolymers significantly and then cure upon application of the sealant. The prepolymers containing these silicone oligomers demonstrate enhanced modulus without sacrifice of flexibility. Additionally, these silicone oligomers improve the thermal stability of the resulting silylated polyurethane systems, and reduce yellowing of polymers containing aromatic structures. More importantly, these silicone oligomers can be used as strong adhesion promoters to improve bonding of sealants or adhesives to many difficult to adhere substrates, especially wet concrete.

In addition to silylated polymers, the oligomers of the present invention can also be useful in a variety of polymer systems, which include, but are not limited to, silicone RTV (room temperature vulcanized), conventional polyurethanes, polysulfides, butyl resins, polyesters, and polyamides. With the addition of these silicone oligomers, such polymers can have more comprehensive applications in adhesives, sealants, or coatings where low viscosity with high modulus and good adhesion are needed.

Oligomer Structure

As stated above, the silicone oligomers useful in the practice of the present invention may be of the formula:

$$[R_3SiO_{1/2}]_m[O_{1/2}Si(R)_2O_{1/2}]_n[SiO_{3/2}R]_o[SiO_{4/2}]_p \qquad (I)$$

wherein:

each R is selected individually from the group consisting of B, $R^1$, —$OR^2$, $R^3$, and $R^4$;

B is an organosilyl functional group bridged to the Si atom of the siloxane oligomer backbone by a Si—C bond;

each $R^1$ is independently a saturated or aromatic hydrocarbon group of 1 to 16 carbon atoms;

each $R^2$ is independently a group as defined for $R^1$ or an acyl group;

each $R^3$ is independently a monovalent organic group containing an aliphatic unsaturated hydrocarbon group;

each $R^4$ is a monovalent organic group linked to the Si atom of the siloxane oligomer backbone by a Si—C bond that does not include an aliphatic unsaturated hydrocarbon group and that has thereon one or more members selected from the group consisting of ether polysulfide, ester, polyester, carbamate, polyurethane, isocyanurate, thioether, blocked mercaptan, amide, cyano, and oximato groups;

with the provisos that at least one R is a B, at least one quarter of all R groups are —$OR^2$, and at least one silicon atom of the oligomer has an $R^3$ group thereon;

m is 2 to 10;

n is 0 to 20;

o is 0 to 20; and p is 0 to 10.

Some of the oligomer structures useful in the practice of the present invention are described in U.S. Pat. No. 6,395,856 and U.S. Pat. No. 6,323,277, the disclosures of which are incorporated herein in their entirety.

In structure I above, B is an organosilyl functional group, -A- W, which comprises a silyl group W and a divalent linking group A which is attached by an Si—C bond to group W and to a silicon atom of the siloxane oligomer. Preferably, there is an average of at least one B group per oligomer molecule, which preferably is internal (i.e., non-terminal) to the oligomer. More preferably, there are at least two B groups per oligomer molecule. Usually, if a B group is attached to a silicon atom of the siloxane backbone, the other R groups on that silicon atom are alkoxy groups.

In the structure B, the divalent linking group, A, creates a non-siloxane bridge between the siloxane oligomer and the silyl group. The linking group A may contain heteroatoms in the structure so long as Si—C bonds are used at the ends of the linking group to form the respective connections to the oligomer and to the silyl group W. The linking group may be linear, branched, or cyclic and may be olefinically or aromatically unsaturated. The linking group may be, for example, alkylene, alkarylalkylene, or alkarylene, or it may be an alkylene that is interrupted by heteroatom-containing organic structures, such as ether, polyether, ester, polyester, carbamate, polyurethane, isocyanurate, thioether, disulfide, tetrasulfide, or the like. Preferably, the linking group is an alkylene of from 2 to 12 carbon atoms. The linking group A may be substituted with silyl or siloxy functions, as well as unsaturated groups. Indeed, group A may form part of a backbone with relatively linear siloxane chains attached to either end of the group. Examples of linking groups A include cycloaliphatic groups, such as 1,4-diethylenecyclohexylene:

or 1,3,-diethylene-5-triethoxysilylethylcyclohexylene:

branched or linear aliphatic groups, such as ethylene, 1,2-propylene, 1,3-propylene, 1,4-butylene, 1,3-butylene, 1,2-butylene or 2,2-dimethyl-1,3-propylene; arylene groups, such as 1,4-phenylene; alkarylalkylene groups, such as 1,4-diethylenephenylene:

divalent polyether groups of the formula:

where q is 1–50, preferably 1–5; r and s are integers of 2–6; and divalent thioether or polysulfide-containing groups of the formula:

where t is 2–16, preferably 2–4, and u is 1–8, preferably 2–4. Preferably, the linking group is alkylene of 2 to 12 carbon atoms, more preferably 2–3 carbon atoms, having hydrolyzable functionality, such as alkoxy or acetoxy functionality. Alternatively, the group W may be a silicon linked organosiloxane or polyorganosiloxane group. Preferably, the silyl group W is an alkoxysilyl group or a further siloxane oligomer of alkoxy silane monomers, more preferably a dialkoxysilyl and, most preferably, a trialkoxysilyl group.

A preferred B group may be represented as $-C_fH_{2f}-SiR^1_g(X)_{3-g}$ wherein the structure $-C_fH_{2f}-$ corresponds to A and the structure $-SiR^1_g(X)_{3-g}$ corresponds to W. Suitably, f is 2 to 12, g is 0 to 2, X is a hydrolyzable group, such as halogen, oxime, alkoxy, aryloxy, alkenoxy, or acetoxy, and $R^1$ is as previously defined. More preferably, f is 2 to 6, g is 0–1, X is methoxy, ethoxy, or acetoxy, and $R^1$ is methyl. Exemplary B groups are $-C_2H_4Si(OCH_3)_3$; $-C_2H_4Si(OC_2H_5)_3$; $-C_2H_4Si(OCH_3)_2(CH_3)$; $-C_2H_4Si(OCH_3)_2Cl$; $-C_2H_4(C_6H_9)(C_2H_4Si(OCH_3)_3)_2$; $-C_2H_4(C_5H_8)C_2H_4Si(OC_2H_5)_3$; and $-C_2H_4Si(OCH_3)_2(OSi(OCH_3)_3)$.

Returning to structure I above, $R^1$ is a saturated or aromatic hydrocarbon of 1 to 16 carbon atoms, e.g., alkyl (linear or branched), cycloalkyl, aryl or alkaryl. Exemplary $R^1$ groups are methyl, ethyl, i-propyl, i-butyl, t-butyl, pentyl, cyclohexyl, octyl, decyl, dodecyl, phenyl, benzyl, or naphthyl. Methyl and ethyl are preferred $R^1$ groups.

$R^2$ is a group as defined for $R^1$ or an acyl group. Examples of acyl groups include acetyl, benzoyl, and propionyl. Preferably, $R^2$ is methyl or ethyl, although if a non-volatilizing oligomer is desired, some of the $R^2$ groups may suitably be dodecyl.

$R^3$ is a monovalent organic group containing an aliphatically unsaturated hydrocarbon group. $R^3$ may contain ethylenic or acetylenic unsaturation. Examples of $R^3$ groups include vinyl, allyl, propargyl, acryloxyalkyl, methacryloxyalkyl, crotyloxyalkyl, styryl, n-octenyl, linolyl, linolenyl and the like. Vinyl, acryloxypropyl, and methacryloxypropyl are preferred. Usually, where a silicon atom has a $R^3$ group, the other R group(s) on that silicon atom will be $-OR^2$, preferably alkoxy.

The R groups on the oligomer may also include one or more $R^4$ groups. $R^4$ is a monovalent organic radical linked to the Si atom of the siloxane oligomer backbone by an Si—C bond, which does not include an aliphatically unsaturated hydrocarbon group and which has one or more ether, polyether, ester, polyester, carbamate, polyurethane, isocyanurate, thioether, polysulfide, blocked mercaptan, amide, cyano, or oximato groups thereon. The term "polysulfide" encompasses groups having the functionality—$S_n$— therein where n is 2–8, preferably 2–4, especially disulfide and tetrasulfide. Blocked mercaptans are functional groups produced by reaction of a mercapto group with a subsequently removable blocking agent. Exemplary blocked mercaptan groups include thioacetal, thiocarboxylate, and other groups disclosed in PCT\US98\17391, filed Aug. 21, 1998, designating U.S.

Preferably, m+n+o+p≦45; more preferably, <30; and most preferably, <15. Preferably, m is 2 to 4, n is 1 to 15, o is 0 to 2, and p is 0 to 1, although it will be understood by those skilled in the art that there may be distributions of the number of siloxy units within a given oligomer batch.

Preferably, there are multiple alkoxy groups available on the oligomer so that, upon curing, these oligomers can cross-link with each other and/or the inorganic filler, if present. Thus, R is $-OR^2$, preferably methoxy or ethoxy, in at least one quarter of the R groups, preferably in at least half of the R groups, while the remainder of the R groups are B or $R^3$ groups, preferably trialkoxysilylethyl groups, more preferably triethoxysilylethyl. Preferably, in such embodiments, p is 0, o is 0, m is 2, and n is 2 to 20.

A preferred formula for the oligomer is wherein R, $R^2$, m, n, and o are as defined above. More preferably, $R^2$ is ethyl, o is 0, m is 2 and n is 0 to 15. Most preferably, all R's are either B, $-OR^2$, or $R^3$, and the oligomer contains at least one B group and at least one $R^3$ group.

It is preferred that the oligomer have a viscosity of 0.5 to 500 csks or, more preferably, 0.5 to 200 csks (25° C.). As will be clear to those skilled in the art, the viscosity of the oligomer may be adjusted by adjusting the number of siloxy groups in the oligomer. In most applications, the viscosity will be adjusted for a specific application to ensure that the composition containing the oligomer will spread over a specific substrate or be sprayable.

For lower molecular weight oligomers, volatility can be reduced significantly by providing alkoxy groups of high chain length, such as octyloxy or dodecyloxy. This can be accomplished by transesterifying readily available methoxy or ethoxy groups to a $C_8$ or higher alkoxy group, for example, an octyloxy or dodecyloxy group. The transesterified oligomers provide hydrophobicity in the filled elastomer compositions and are permanently bound to the polymer when the compound is cross-linked, usually with peroxides.

If coupling to filler is required for mechanical property improvement, the lower alkoxy moieties are preferred. They may be attached to the backbone of the oligomer, or pendant if a subsequent hydrosilation process is employed to attach them to the vinyl groups. Oligomers which contain both lower and higher alkoxy groups, e.g., by partially transesterifying lower alkoxy groups, permit fine tuning of hydrophobicity and filler coupling properties. Thus, the synthesis processes employed provide a multiplicity of structures within the overall scope of the invention.

Oligomer Manufacture

The oligomers may be formed in a two step process or a one step process. In the two step process a condensation reaction is followed by a hydrosilation reaction. Such a two step process comprises (1) producing a siloxane oligomer with olefinically unsaturated (ethylenic or acetylenic) groups by condensation from an unsaturated alkoxy silane, and, optionally, other alkoxy silanes; and (2) partially hydrosilylating the oligomer produced in step (1) with an alkoxyhydridosilane or siloxane. In the one step process, bis-alkoxysilane(s), wherein the silane silicon atoms are bridged by a divalent linking group as described in the description of the group B above, are condensed, preferably with other alkoxy silanes, to form a siloxane oligomer.

The condensation may be performed according to any of the procedures disclosed in, for example, U.S. Pat. No. 4,950,779; U.S. Pat. No. 5,282,998; and U.S. Pat. No. 5,210,168. In the two step process, the first starting material is either an olefinically unsaturated alkoxy silane or a hydrido alkoxy silane, which preferably are trialkoxysilanes. The alkoxy groups may be $C_1–C_{12}$, may be branched, cyclic, or include aryl groups, and may include heteroatoms. The preferred alkoxy groups are methoxy, ethoxy, isopropoxy, n-butoxy, and cyclohexoxy. Examples of the unsaturated group include vinyl, acryl, methacryl, acrylate, acetylenyl, or any 1,2 unsaturated olefin. There may be different such unsaturated groups within one oligomer.

The starting material for the one step process is a bis, tris, or higher alkoxysilane. Preferably, a bis-dialkoxysilane or bis-trialkoxysilane is the starting material. Exemplary silanes include 1,4-bis-(triethoxysilylethyl)cyclohexane; 1,3,5-tris-(triethoxysilylethyl)cyclohexane; and 1,4-bis-(triethoxysilyl)butane.

During condensation, other optional alkoxy or acyloxy silanes may be incorporated into the oligomer including, but not limited to, aryl silanes, alkyl silanes, carbamato silanes, cyano silanes, polyalkylene oxide silanes, ester silanes, or isocyanurate silanes. These silanes must have at least one alkoxy group or acyloxy (in which case, they would form terminal units on the oligomer), but preferably are di- or tri-alkoxy silanes. Specific examples of these silanes include: bis-(triethoxysilylethyl)benzene, tris-(2-triethoxysilylethyl)cyclohexane, and methyl N-(3-trimethoxysilylpropyl)carbamate. In the one step reaction, the characteristic bridging structure in the oligomers of the invention is provided by use of the bis, tris or higher alkoxy silanes.

Moreover, in the condensation, dialkoxysiloxy units may be inserted into the oligomer to affect the cross-linking, surface active, and viscoelastic properties of the oligomer. This insertion may be done by using tetraalkoxysilanes, such as tetramethoxysilane or tetraethoxysilane.

The condensation of the alkoxy silane monomers is suitably performed in the presence of a carboxylic acid (e.g., acetic or formic acid) or water. Alternatively, a strong condensation catalyst may be used, e.g., a strong acid or an acidic ion exchange resin, such as AMBERLYST resin from Rohm & Haas Co. The other reaction conditions of the condensation will depend on the monomeric silanes; however, temperature ordinarily will be in the range of 20 to 60° C. Other examples of suitable reaction conditions may be found in U.S. Pat. No. 4,950,779; U.S. Pat. No. 5,282, 998; and U.S. Pat. No. 5,210,168; all of which are incorporated herein by reference.

In the two step process, the product of the condensation is a siloxane oligomer containing a plurality of unsaturated groups attached to silicon atoms on the siloxane oligomer backbone by Si—C bonds. The unsaturated functionalized siloxane oligomer produced in Step 1 is reacted with a hydrido silane in the presence of a known hydrosilation catalyst, for instance a platinum, palladium, or rhodium based catalyst. Such hydrosilation, for example, may be accomplished according to U.S. Pat. Nos. 5,530,152 and 5,527,936, which are incorporated herein by reference. It is preferred that the hydrido silane be a silane having multiple hydrolyzable groups, such as a trialkoxysilane, to afford multiple cross-linkable sites on the resulting oligomer. During reaction, hydridosilane is reacted with unsaturated group (s) on the oligomer such that a bond is formed between the silicon atom and the unsaturated group (which, if ethylenic, is saturated in the process). A deficiency of the hydridosilane is used, relative to the number of unsaturated groups available on the oligomer so that at least about one unsaturated group per oligomer molecule remains after the hydrosilation. The unsaturated groups remaining on the oligomer after the hydrosilation allow the oligomer to become crosslinked with the organic polymer matrix during the subsequent cure reaction of the organic polymer/filler/coupling agent compositions.

Compositions of Curable Polymer Systems

In the compositions of the present invention, there will normally be from about 1 to about 40 parts by weight of oligomer per 100 part by weight of curable polymer. Preferably, there will be from about 3 to about 20 parts by weight of oligomer per 100 part by weight of curable polymer.

Moisture curable polymer systems, for example, silylated polyurethanes were synthesized from polyols reacted with polyisocyanates, then capped by silanes. Suitable polyols include polyoxyalkylene (especially polyoxyethylene, polyoxypropylene, and polyoxybutylene) diols, polyoxyalkylene triols, polytetramethylene glycols, polycaprolactone diols and triols, and the like. Other polyol compounds, including tetraols thereof, may also be used, including pentaerythritol, sorbitol, mannitol and the like. Preferred polyols used in the present invention are polypropylene glycols with equivalent weights in the range of from about 500 to about 20,000; preferably, between about 2000 and 12,000. Mixtures of polyols of various structures, molecular weights and/or functionalities may also be used.

Suitable polyurethane prepolymer intermediates include any from polyurethane polymers that can be prepared by the chain extension reaction of polyols with diisocyanates. Useful diisocyanates include, for example, 2,4-toluene diisocyanate; 2,6-toluene diisocyanate; 4,4'-diphenylmethanediisocyanate; isophorone diisocyanate; dicyclohexylmethane-4,4'-diisocyanate; various liquid diphenylmethanediisocyanates containing a branch or a mixture of 2,4- and 4,4' isomers and the like, and mixtures thereof.

Silane endcappers suitable in the present invention for the endcapping of isocyanate terminated urethane prepolymers are represented by the general formula:

wherein R is a divalent organic group; R' is alkyl or aryl, preferably having from 1 to 8 carbon atoms, X is a hydrolyzable alkoxy, or alkyloximido group, preferably having from 1 to 4 carbon atoms; and n is an integer from 1 to 3. Group R" is an organo-functional group, which can react with either isocyano or hydroxyl terminated polymers, such as isocyanato, primary or secondary amino, mercapto, or ureido functional groups.

Formulations useful, for example, as silylated polyurethane based sealants can be prepared by thoroughly mixing together the above mentioned silicone oligomers, silylated polyurethane prepolymer, a cure catalyst, and, optionally, one or more conventional functional adjuvants, such as fillers, plasticizers, thixotropes, antioxidants, UV stabilizers, and/or adhesion promoter(s). Effective mixing can be achieved using a double planetary mixer.

Typical fillers suitable for addition to such formulations include reinforcing fillers, such as fumed silica, precipitated silica, clay, carbon black, and calcium carbonates. Treated calcium carbonates having particle sizes from 0.07 μm to 4 μm are preferred.

Any of the plasticizers usually used in this field can also be used in the invention to increase elongation and to facilitate use of higher filler levels. Exemplary plasticizers include phthalates, dipropylene glycol dibenzoates and mixtures thereof, epoxidized soybean oil, and the like.

The formulations can include various thixotropic or anti-sagging agents. This class of additives is typified by various castor waxes, fumed silica, treated clays, and polyamides. These additives typically comprise 1 to 10 parts per hundred parts of silane terminated polyurethane polymer component with 1 to 6 parts being preferred. If the thixotrope (e.g., silica) is reactive with silane or silane oligomers, adjustments to the amount formulated may be needed to compensate therefor.

UV stabilizers and/or antioxidants can be incorporated into the formulations of this invention in an amount in the range of from 0 to about 5 parts per hundred parts silylated polyurethane prepolymer with 0.5 to 2 parts being preferred.

Various organofunctional silane adhesion promoters are also optional in the formulations of the present invention. These materials are typically employed at levels in the range of from 0 to about 5 parts per hundred parts of the silylated urethane polymer with 0.8 to 1.5 parts per hundred parts of polymer preferred. Suitable adhesion promoters include Silquest™ silanes, such as γ-aminopropyltrimethoxysilane, γ-aminopropyltriethoxysilane, β-aminoethyl-γ-aminopropyltrimethoxysilane, β-aminoethyl-γ-aminopropylmethyldimethoxysilane, bis-(γ-trimethoxysilylpropyl)amine, γ-glycidoxypropyltrimethoxysilane, γ-glycidoxypropylmethyldiethoxysilane, 4-(dimethoxysilylmethyl)-2,2-dimethylbutanamine, and 4-(trimethoxysilyl)-2,2-dimethylbutanamine, all of which are available from Crompton Corp., OSi Specialties. Ethoxy- and mixed methoxy-/ethoxy-versions of all of these silanes may be used as well.

Suitable cure catalysts are the same as those that are described for the preparation of the silylated urethane polymers in U.S. Pat. No. 6,310,170. Such catalysts include dialkyltin dicarboxylates, such as dibutyltin dilaurate and dibutyltin acetate, tertiary amines, the stannous salts of carboxylic acids, such as stannous octoate and stannous acetate, and the like. The preferred catalyst is dibutyltin dilaurate. The catalysts typically comprise 0.01 to 3 parts per hundred parts silylated polyurethane prepolymer with 0.03 to 1.0 part per hundred parts polymer being preferred.

After mixing, the formulations are cured by exposure to moisture. For example, sealants are typically cured at 23° C. and 50% relative humidity for 3 days and 37° C. and 95% relative humidity for another 4 days.

The advantages and the important features of the present invention will be more apparent from the following examples.

EXAMPLES

Preparation of Silane Oligomers

The detailed procedure for making the silane oligomers has been described in the U.S. Pat. Nos. 6,323,277 and 6,207,783. The oligomers used herein were prepared as follows:

Oligomer 1

To a 3 liter reaction flask was added with stirring 592.8 grams of vinyltrimethoxy-silane, 545.2 grams of methyltrimethoxysilane, 152.2 grams of tetramethyl orthosilicate, and 6.6 grams of Purolite CT-175 acidic ion exchange resin. To this mixture was added with rapid stirring 144.9 grams of deionized water over 1 hour as the reaction temperature increased to 53° C. After stirring an additional 1.5 hours, 416 grams of methanol was distilled from the reaction mixture. After filtration, 887 grams of clear, colorless oligomer was isolated.

To 667 grams of this oligomer in a two liter reaction flask equipped with a dropping funnel, water condenser, thermocouple, and stirrer, 0.3 mL of a Pt(0)/1,3-divinyl-1,1,3,3-tetramethyldisiloxane complex (1.9% Pt) in xylenes was added. The flask was then heated to 110° C. and 378 grams of trimethoxysilane was added over two hours at such a rate as to maintain the reaction temperature between 115–135° C. The reaction was stirred an additional one hour at 110° C. A gas chromatographic analysis indicated that no trimethoxysilane remained, thereby confirming the completion of the reaction. Any low boiling components were distilled from the reaction mixture and, after treatment with activated carbon, 970 grams of clear, colorless siloxane oligomer was isolated. Analysis by NMR confirmed that no vinyl siloxane was present. The viscosity was 6.2 cstks. by a comparison to a Gardner bubble tube.

Oligomer 2

To a 500 mL reaction flask was added with stirring 59.3 grams of vinyltrimethoxysilane, 54.5 grams of methyltrimethoxysilane, 60.9 grams of tetramethyl orthosilicate, 0.9 gram of Purolite CT-175 acidic ion exchange resin, and 20.7 grams of water. This mixture was stirred overnight. After filtration, 71 grams of methanol was distilled from the oligomer mixture.

To 105.7 grams of this oligomer in a 250 mL flask equipped with a dropping funnel, water condenser, thermocouple, and magnetic stirrer, 39 μL of a Pt(0)/1,3-divinyl-1,1,3,3-tetramethyldisiloxane complex (2.5% Pt) in xylenes was added. The flask was then heated to 110° C. and 48.8 grams of trimethoxysilane was added over 1 hour at such a rate as to maintain the reaction temperature between 110–127° C. The reaction was stirred an additional 1 hour at 110° C. A gas chromatographic analysis indicated that the trimethoxysilane had disappeared, thereby confirming the completion of the reaction. Any low boiling components were distilled from the oligomer yielding 161 grams of product. Analysis by NMR confirmed that no vinyl siloxane was present. The viscosity was 14 cstks. when compared to a Gardner bubble tube.

Oligomer 3

To a 500 mL reaction flask equipped with a thermocouple and distillation head was added with stirring 74.1 grams of vinyltrimethoxysilane, 68.2 grams of methyltrimethoxysilane, 69.4 grams of phenyltrimethoxysilane, 21.9 grams of methylphenyl-dimethoxysilane, 1.2 grams of Purolite CT-175 acidic ion exchange resin, and 22.3 grams of water. The reaction mixture increased in temperature upon the addition of water to 38° C. After stirring 4 hours, a gas chromatographic analysis indicated that no starting methyl- or vinyltrimethoxysilane remained in the reaction mixture. The flask contents were filtered and 45 grams of methanol was removed by vacuum distillation. The viscosity was 0.5 cstks. by a Gardner bubble tube comparison.

To 122.5 grams of this oligomer in a 250 mL reaction vessel equipped with a dropping funnel, water condenser, thermocouple, and magnetic stirrer, 68 μL of a Pt(0)/1,3-divinyl-1,1,3,3-tetramethyldisiloxane complex (1.9% Pt) in xylenes was added. The flask was then heated to 110° C. and 43.3 grams of trimethoxysilane was added over 45 minutes at such a rate as to maintain the reaction temperature between 110–130° C. The reaction was stirred an additional two hours at 110° C. A gas chromatographic analysis indicated that no trimethoxysilane remained in the reaction mixture. Any low boiling components were distilled from the oligomer yielding 155.6 grams of product. Analysis by NMR confirmed that no vinyl siloxane was present. The viscosity was 6 cstks. by a comparison to a Gardner bubble tube.

Oligomer 4

To a 500 mL reaction flask equipped with a thermocouple and distillation head was added with stirring 136.3 grams of methyltrimethoxysilane, 69.4 grams of phenyltrimethoxysilane, 21.9 grams of methylphenyldimethoxysilane, 1.2 grams of Purolite CT-175 acidic ion exchange resin, and 22.3 grams of water. The reaction mixture increased in temperature upon the addition of water to 42° C. After stirring overnight, a gas chromatographic analysis indicated that only a small amount of starting methyltrimethoxysilane remained in the reaction mixture. The flask contents were filtered and 35 grams of methanol was removed by vacuum distillation. Of the 162.3 grams of remaining oligomer the viscosity was 0.5 cstks. by a Gardner bubble tube comparison.

Oligomer 5

To a 2 liter reaction flask equipped with a thermocouple and distillation head was added with stirring 553.0 grams of octyltriethoxysilane, 416.7 grams of tetraethyl orthosilicate, 5.1 grams of Purolite CT-175 acidic ion exchange resin, and 161.1 grams of 96% formic acid. The reaction mixture was heated with stirring to 75° C. Over 8 hours, 312 grams of a combination of ethanol and ethyl formate were removed from the reaction vessel by distillation. After stirring overnight, a gas chromatographic analysis indicated that only a small amount of the starting tetraethyl orthosilicate remained in the reaction mixture. The flask contents were filtered and after a final vacuum distillation, 603.5 grams of clear, colorless oligomer was produced. The viscosity of that oligomer was 22 cstks. by a Gardner bubble tube comparison.

Oligomer 6

To a 1 liter reaction flask equipped with a thermocouple, dropping funnel, and distillation head was added with stirring 148.2 grams of vinyltrimethoxysilane, 211.6 grams of phenyltrichlorosilane, and 152.2 grams of tetramethyl orthosilicate. To the funnel was added 48.6 grams of water and 64 grams of methanol. The reaction mixture was heated with stirring to 65° C. and about 5 drops of the water/methanol solution was added to the flask. The flask contents were stirred at 70° C. for several hours and then cooled. The remaining water/methanol solution was added at room temperature and methanol/HCl was distilled from the flask under 200 mm Hg vacuum. At the end of the addition, the flask temperature and vacuum were increased to remove the last traces of low boiling materials. The yield was 350 grams of clear, colorless oligomer.

To this oligomer in the same reaction vessel equipped with a dropping funnel, water condenser, thermocouple, and magnetic stirrer, 0.4 mL of a Pt(0)/1,3-divinyl-1,1,3,3-tetramethyldisiloxane complex (1.53% Pt) in xylenes was added. The flask was then heated to 110° C. and 122 grams of trimethoxysilane was added over 45 minutes at such a rate as to maintain the reaction temperature between 110–130° C. The temperature was maintained at 120° C. for 2 hours to ensure reaction completion. Low boiling components were vacuum distilled, yielding 428 grams of clear, slightly amber siloxane oligomer of 14 cstks viscosity by a comparison to a Gardner bubble tube.

Oligomer 7

To a 1 liter reaction flask equipped with a dropping funnel, thermocouple, and distillation head was added 222.3 grams of vinyltrimethoxysilane, 228.3 grams of tetramethyl orthosilicate, and 2.1 grams of Purolite CT-175 acidic ion exchange resin. From the funnel was added 124.3 grams of 96% formic acid with stirring. The flask temperature gradually increased to 50° C. after the formic acid addition, followed by distillation at 80° C. and finally under vacuum to remove methanol/methyl formate. This resulted in 315.9 grams of clear, straw-colored oligomer.

To this oligomer in the same reaction vessel equipped with a dropping funnel, water condenser, thermocouple, and magnetic stirrer, 0.7 mL of a Pt(0)/1,3-divinyl-1,1,3,3-tetramethyldisiloxane complex (1.53% Pt) in xylenes was added. The flask was then heated to 110° C. and 219.6 grams of trimethoxysilane was added over 1.5 hours at such a rate as to maintain the reaction temperature between 110–130° C. The temperature was maintained at 120° C. for 2 hours to ensure reaction completion. Low boiling components were vacuum distilled, yielding 485 grams of clear, amber oligomer of 14 cstks viscosity by a comparison to a Gardner bubble tube.

Oligomer 8

To a 2 liter reaction flask equipped with a thermocouple and distillation head was added with stirring 714 grams of 3-mercaptopropyl-triethoxysilane, 5.2 grams of Purolite CT-175 acidic ion exchange resin, and 174.8 grams of 96% formic acid. The reaction mixture was heated with stirring to 60° C. Over 6 hours, 145 grams of a combination of ethanol and ethyl formate were removed from the reaction vessel by distillation. After stirring overnight, a gas chromatographic analysis indicated that only a small amount of the starting 3-mercaptopropyl-triethoxysilane remained in the reaction mixture. The flask contents were filtered and after a final vacuum distillation to remove low boiling components, 540 grams of clear, colorless oligomer was produced. The viscosity of that oligomer was 14 cstks. by a Gardner bubble tube comparison.

Oligomer 9

To the same apparatus as for Oligomer 8 was added 500 grams of 3-mercaptopropyl trimethoxysilane, 2.7 grams of Purolite CT-175 acidic ion exchange resin, and 94.4 grams of 96% of formic acid. The reaction mixture was heated with stirring to 60° C. The combination of methanol and methyl formate was removed form the reaction vessel by distillation. The flask contents were filtered and after a final vacuum distillation to remove low boiling components, 401 grams of clear, colorless oligomer was produced.

To a 250 mL reaction flask equipped with a thermocouple and magnetic stirrer was added 100 grams of the oligomer, 25 grams of tetramethyl silicate, and 2 drops of Aldrich 99% trifluoromethanesulfonic acid. The solution was stirred over three days at room temperature. The acid catalyst was neutralized by stirring with excess sodium carbonate, followed by filtration. The viscosity of this oligomer was 14 cstks.

Oligomer 10

To a 1 liter reaction flask equipped with a short path distillation head, thermocouple, magnetic stirrer, and heating mantle was added 148.2 grams (1.0 mole) of vinyltrimethoxysilane, 120.2 grams (1.0 mole) of dimethyldimethoxysilane, 152.2 grams (1.0 mole) tetramethyl silicate, and 1.9 grams of Purolite CT-175 acidic ion exchange resin. With stirring, 109.0 grams (2.4 moles) of formic acid was added. The flask contents were heated to 55–70° C. removing 214.8 grams of a combination of methanol and methyl formate. After cooling, the oligomeric material in the flask was filtered to yield 268.1 grams of clear, colorless product A gas chromatograph of this material indicated no vinyltrimethoxysilane monomer remaining.

To this oligomer in the same reaction vessel equipped with a dropping funnel, water condenser, thermocouple, and magnetic stirrer, 0.48 gram of platinum(0)-1,3-divinyl-1,1,3,3-tetramethyldisiloxane complex (containing approximately 1.5% Pt) solution in xylene (Aldrich Chemicals) was added. The flask contents were heated to 110° C. and 122 grams (1.0 mole) of trimethoxysilane was added at such a rate that the flask temperature did not exceed 125° C. After the addition the contents were maintained at 100–110° C. for 4 hours. The oligomer was cooled to 60° C. and any low boiling components were removed under 1 mm Hg vacuum, resulting in 369 grams of a clear, yellow siliconate oligomer.

Oligomer 11

To a 3 liter reaction flask equipped with a short path distillation head, thermocouple, magnetic stirrer, and heating mantle was added 1400.0 grams (7.4 moles) of vinyltriethoxysilane, 99.3 grams (5.5 moles) water, and 6.9 grams of Purolite CT-275 acidic ion exchange resin. The contents of the flask were heated with stirring to 70–90° C. and ethanol was distilled. The last amount of ethanol was removed under reduced pressure. The total ethanol removed was 383 g. The product oligomer was filtered to give 962.5 grams of oligomeric product.

Oligomer 12

To a 2 liter reaction flask equipped with a six inch Vigreux column with a short path distillation head, thermocouple, heating mantle, and addition funnel was added 357.6 grams (1.5 moles) of 3-mercaptopropyltriethoxysilane, 414.8 grams (1.5 moles) of octyltriethoxysilane, and 3.4 grams of Purolite CT-175 acidic ion exchange resin. While heating to 70° C. with stirring, 119 grams (2.59 moles) of 96% formic acid was quickly added from the addition funnel, collecting a combination of ethanol and ethyl formate in the receiver. After the formic acid was added, the flask contents were heated to 100° C. and under partial vacuum to remove any remaining ethanol/ethyl formate. The resultant clear, colorless oligomer (571.4 grams) had a viscosity of 10 cstks. by Gardner bubble tube.

Preparation of Silylated Polyurethane Prepolymers

Prepolymer 1

The silylated polyurethane prepolymers herein were typically synthesized in a two-step reaction sequence as described in the U.S. Pat. Nos. 6,310,170 and 6,207,783. The prepolymer was made from polypropylene ether diols (PPG 4000) and diisocyanate (MDI) with NCO/OH ratio of 1.5. The reaction took place at 65°–70° C. until the concentration of NCO dropped down to 0.9 wt % by titration. Then N-phenylaminopropyltrimethoxy silane (Silquest® Y-9669) was added to react with all remained NCO groups to form silane terminated polyurethane prepolymers having a viscosity of about 100,000 cps at room temperature.

Prepolymer 2

With the same procedure as used for the preparation of Prepolymer 1, polypropylene ether diols (PPG 3000) and isophorone diisocyanate (IPDI) with an NCO/OH ratio of 1.7 were used. The reaction took place at 65°–70° C. until the concentration of NCO dropped down to 1.85%. Then N-ethylisobutyl trimethoxysilane (Silquest® A Link 15) was added to cap all remaining NCO groups to form a silane terminated thin prepolymer with a viscosity of 20,000 cps at room temperature.

Preparation of Samples of Oligomer-containing Prepolymer

Example 1

Prepolymer 1 (80 grams), Oligomer 1 (20 grams) and 1 gram of dibutyltin dilaurate (DBTDL) were mixed in a Hauschild Speed Mixer for two minutes to make a blend sample containing 20% of the oligomers.

Example 2

The procedure for Example 1 was repeated, but Oligomer 2 was used instead of Oligomer 1.

Example 3

The procedure for Example 1 was repeated, but Oligomer 3 was used instead of Oligomer 1.

Example 4

The procedure for Example 1 was repeated, but Oligomer 4 was used instead of Oligomer 1.

Example 5

The procedure for Example 1 was repeated, but Oligomer 5 was used instead of Oligomer 1.

Example 6

The procedure for Example 1 was repeated, but Oligomer 6 was used instead of Oligomer 1.

Example 7

The procedure for Example 1 was repeated, but Oligomer 7 was used instead of Oligomer 1.

The blends with different contents of oligomer were prepared by the same method for testing viscosity reduction and yellowing control.

Preparation of Oligomer Contained Coating Solutions

Coating Solution 1

Prepolymer 2 (35 grams), Oligomer 5 (15 grams) and 0.5 gram of Fomrez® 11A were mixed in a Hauschild Speed Mixer for 2 minutes to provide a coating solution containing 30% the oligomers.

Coating Solution 2

The procedure for Coating Solution 1 ws repeated, but Oligomer 8 was used instead of Oligomer 5.

Coating Solution 3

The procedure for Coating Solution 1 ws repeated, but Oligomer 11 was used instead of Oligomer 5.

Coating Solution 4

The procedure for Coating Solution 1 ws repeated, but Oligomer 12 was used instead of Oligomer 5.

Comparative Coating Solution

The procedure for Coating Solution 1 ws repeated, but toluene was used instead of Oligomer 5.

Preparation of Oligomer Contained Sealants

TABLE 1

Sealant Formulation

| | Weight (grams) |
|---|---|
| Silylated polyurethane prepolymer 1 | 30 |
| DIDP* | 12 |
| Silicone Oligomer | 6.0 |
| Calcium carbonate | 30 |
| SiO$_2$ | 1.8 |
| Silquest ® Y-11639 silane** | 0.3 |
| DBTDL | 0.04 |

*DIDP is diisodecyl diphthalate.
**Y-11639 silane is 4-(dimethoxysilylmethyl)-2,2-dimethylbutanamine, an adhesion promoter.

Sealant 1

According to the formulation, the silylated polyurethane prepolymer 1, DIDP, and Oligomer 5 were first blended in a Hauschild Speed Mixer for 1 minute, then 18 grams of calcium carbonate was added in and blended for 1 minute. Additional calcium carbonate (12 grams) and SiO$_2$ were added in the same manner step by step to ensure a homogeneous mixing. The Y-11639 silane and DBTDL were added last and blended again for 1 minute to finish.

Sealant 2

The procedure for Sealant 1 was repeated, but Oligomer 6 was used instead of Oligomer 5.

Sealant 3

The procedure for Sealant 1 was repeated, but Oligomer 8 was used instead of Oligomer 5.

Sealant 4

The procedure for Sealant 1 was repeated, but Oligomer 9 was used instead of Oligomer 5.

Sealant 5

The procedure for Sealant 1 was repeated, but Oligomer 10 was used instead of Oligomer 5.

Sealant 6

The procedure for Sealant 1 was repeated, but Oligomer 11 was used instead of Oligomer 5.

Sealant 7

The procedure for Sealant 1 was repeated, but Oligomer 12 was used instead of Oligomer 5.

Comparative Sealant

The procedure for Sealant 1 was repeated without silicone oligomers.

Test Methods

Mechanical Property Test:

Mechanical properties were tested using ASTM specifications. Tensile strength, elongation, modulus (ASTM D412), Shore A hardness (ASTM C661), and tear resistance (ASTM D 624) data were obtained on samples cured according to the following schedule: 3 days at 23° C. and 50% RH followed by additional 4 days at 50° C.

Color Stability:

The cured films were stored in an oven at 80° C. for seven days. The yellow index changes were measured before and after heat treatment using a Minolta Chroma Meter CR-221.

Solvent Resistance of the Coatings:

The oligomer-containing polymeric coating solutions were coated on aluminum Q-panels and then cured in an oven at 25° C. and 50% relative humidity for three days followed by four days in an oven at 50° C. The thicknesses of the cured coatings are 0.3 mm±0.05 mm. Solvent resistance of the coating was measured by the method of methyl ethyl ketone double rubs according to ASTM D 5402.

Wet Adhesion to Concrete:

Concrete substrates were immersed in supersaturated KOH solution for at least 24 hours, then rinsed with deionized water. The cleaned substrates were air dried prior to use.

The adhesion-in-peel testing was conducted in accordance with the ASTM C$_{794}$ procedure. The sealant samples were spread over ⅔ of the substrate coupon to a depth of approximately ¹⁄₁₆". The sealant was then covered with an aluminum screen (30 mesh) that was covered with an additional ¹⁄₁₆" layer of the sealant. Specimens were cured for 21 days according to the following schedule: 7 days at 23° C. and 50% RH; 7 days at 38° C. and 95% RH; and 7 days at 23° C. and 50% RH. The cured specimens were immersed into water for 7 days before testing. The 180° peel strength was measured on an Instron Tensile Tester.

Dynamic Mechanical Testing:

The elastic modulus (G') was measured using an ARES rheometer made by Rheometric Scientific, equipped with a liquid nitrogen controller and a heating system for a wide range of temperature operation.

The test samples were prepared by casting films of the materials with thicknesses in the range of 1–4 mm. After cure, the samples were cut into round disks having a diameter of 8.0 mm. The ARES was set in the mode of dynamic time sweep at temperature of 150° C. with nitrogen purged through the chamber. A strain of 1% was applied to the sample at a frequency of 6.28 rad/s. The torque generated during the measurement was recorded every 5 seconds.

Results

TABLE 2

Reduction of Prepolymer Viscosity with Silane Oligomers

| | Viscosity (cps) @ 25° C. | | |
|---|---|---|---|
| | Pure prepolymer | With 5% Oligomer | With 20% Oligomer |
| Example 4 | 98,300 | 75,763 | 26,275 |
| Example 5 | 98,300 | | 38,434 |
| Example 6 | 103,280 | | 80,765 |
| Example 7 | 103,280 | | 54,641 |

TABLE 3

Mechanical Properties of Silylated Polyurethane Prepolymer with 20% of Oligomers

| | Oligomer used | Tensile Strength (psi) | Young's modulus (psi) | Elongation (%) | Shore A Hardness |
|---|---|---|---|---|---|
| Comparative Example 1 | None | 72 | 72 | 164 | 31 |
| | Oligomer 1 | 383 | 437 | 130 | 54 |

TABLE 3-continued

Mechanical Properties of Silylated Polyurethane Prepolymer with 20% of Oligomers

|  | Oligomer used | Tensile Strength (psi) | Young's modulus (psi) | Elongation (%) | Shore A Hardness |
| --- | --- | --- | --- | --- | --- |
| Example 2 | Oligomer 2 | 330 | 316 | 153 | 50 |
| Example 3 | Oligomer 3 | 441 | 396 | 185 | 45 |
| Example 4 | Oligomer 4 | 239 | 180 | 226 | 42 |
| Example 5 | Oligomer 5 | 121 | 61 | 316 | 31 |
| Example 6 | Oligomer 6 | 675 | 589 | 174 | 50 |
| Example 7 | Oligomer 7 | 289 | 258 | 156 | 47 |

TABLE 4

Results of Yellowing Test for Silylated Polyurethane Prepolymer with/without Oligomers

|  | b The Yellow Index | | |
| --- | --- | --- | --- |
|  | Before Exposure | After Exposure | Δb |
| Pure Prepolymer | 5.28 | 56.13 | 50.58 |
| with 5% Oligomer 6 | 4.16 | 17.07 | 12.91 |
| with 10% Oligomer 6 | 5.22 | 9.88 | 4.66 |
| with 20% Oligomer 6 | 5.11 | 9.57 | 4.46 |

TABLE 5

Reduction of Viscosity for Coating Solutions with 30% Oligomers

|  | Viscosity before dilution cps @ 25° C. | 30% diluent | Viscosity after dilution cps @ 25° C. |
| --- | --- | --- | --- |
| Comparative solution | 20,000 | Toluene | 2,000 |
| Coating Solution 1 | 20,000 | Oligomer 5 | 2,800 |
| Coating Solution 2 | 20,000 | Oligomer 8 | 14,000 |
| Coating Solution 3 | 20,000 | Oligomer 11 | 6,800 |
| Coating Solution 4 | 20,000 | Oligomer 12 | 2,500 |

TABLE 6

Chemical Resistance of the Oligomer-Containing Coatings

|  | Diluent | MEK Double Rubs | Adhesion* |
| --- | --- | --- | --- |
| Comparative solution | Toluene | 219 | D |
| Coating Solution 1 | Oligomer 5 | >1000 | A |
| Coating Solution 2 | Oligomer 8 | >1000 | B |
| Coating Solution 3 | Oligomer 11 | 900 | C |
| Coating Solution 4 | Oligomer 12 | >1000 | A |

*The adhesion of the coatings to the panel was graded from A to D with A representing the best adhesion and D representing the poorest adhesion.

TABLE 7

Adhesion of Oligomer-Containing Sealants on Wet Concrete

|  |  | Wet Adhesion to Concrete | |
| --- | --- | --- | --- |
| Sealant | Oligomer Used | Peel Strength (lb/in) | Failure |
| Sealant 1 | Oligomer 5 | 8.2 | 100% CF |
| Sealant 2 | Oligomer 6 | 3.4 | 100% CF |
| Sealant 3 | Oligomer 8 | 20.5 | 70% CF |
| Sealant 4 | Oligomer 9 | 6.1 | 100% CF |
| Sealant 5 | Oligomer 10 | 6.8 | 100% CF |
| Sealant 6 | Oligomer 11 | 8.9 | 50% CF |
| Sealant 7 | Oligomer 12 | 14 | 100% CF |
| Comparative Sealant |  | 3.4 | 100% AF |

CF is cohesive failure; AF is adhesive failure.

Thus, it is seen that the silicone oligomers used as reactive diluents in the practice of the present invention can significantly reduce the viscosity of the prepolymer, which improves the ease of processing for coatings, adhesives, and sealants. They also enhance the durability of the cured product. The degree of the improvement varies with the structures of the oligomer applied. Most of the oligomers give the products higher modulus without sacrificing the elongation. An exception is Oligomer 5, which improves flexibility of the product and maintains essentially the same product modulus.

For oligomers applied in coating solutions as diluents, the efficiency of dilution depends on the compatibility of the oligomer with the polymer used. In the above examples, Oligomers 5 and 12 showed efficiencies of dilution almost as high as that of toluene. Further, after cure, the oligomers act as cross-linkers to improve the solvent and mar resistance of the coatings.

Yellowing upon heat or UV exposure has been a concern for polyurethanes that contain aromatic structures from either diisocyanates or polyols. This type of polyurethane showed improved color stability in the above examples when the silicone oligomers were applied as additives. A substantial improvement was observed when only 5% of the oligomer was added, even with oligomers having aromatic structures themselves, such as Oligomer 6.

Figure 1:
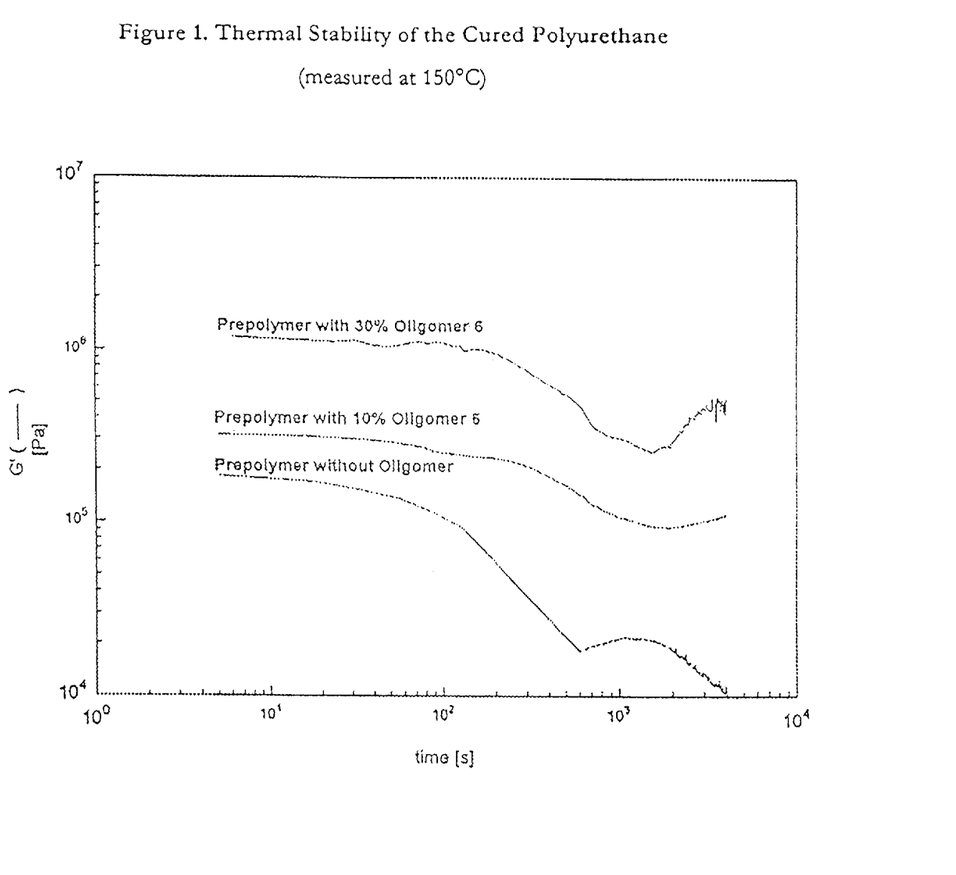
FIG. 1 is a graph showing the thermal stability of cured polyurethanes with and without the oligomers employed in the practice of the present invention.

Improved thermal stability of the oligomer-containing polyurethane was observed from the study using the ARES dynamic mechanical analyzer. The polymers containing silicone oligomers demonstrated higher elastic (storage) modulus (G') compared to those without the oligomers. High cross-linking density introduced by the oligomers gave the polyurethanes not only increased mechanical strength, but also improved their stability at high temperatures, as shown in FIG. 1. Degradation of the polymer chains at high temperatures was monitored by the decline of the G' curve during the test. Clearly, from FIG. 1, the degradation of the polymers was delayed and the degree of the degradation was reduced for the samples having the oligomers compared to those without oligomers.

Several silicone oligomers have been proven as effective adhesion promoters for difficult substrates, such as wet concrete, the most difficult substrate for construction sealants. In the above examples, cohesive failure on wet concrete was observed on most oligomer-contained sealants tested, which means strong bonds or interactions were formed at the interface between the sealants and the substrates. In contrast, adhesive failure was noted for the comparative sealant sample without oligomers. The adhesive failure indicated that there was no bonding or weak bonding between the substrates and polymers. Excellent peel strength was observed from samples containing Oligomers 5, 8, 11, and 12.

In view of the many changes and modifications that can be made without departing from principles underlying the invention, reference should be made to the appended claims for an understanding of the scope of the protection to be afforded the invention.

What is claimed is:

1. A composition comprising:
   A) a moisture curable polymer selected from the group consisting of silylated polyurethanes, silylated polyethers, and mixtures thereof, and
   B) a silicone oligomer of the formula:

$$[R_3SiO_{1/2}]_m[O_{1/2}Si(R)_2O_{1/2}]_n[SiO_{3/2}R]_o[SiO_{4/2}]_p \qquad (I)$$

wherein:
   each R is independently selected from the group consisting of B, $R^1$, —$OR^2$, $R^3$, and $R^4$;
   B is an organosilyl functional group bridged to the Si atom of the siloxane oligomer backbone by a Si—C bond;
   each $R^1$ is independently a saturated or aromatic hydrocarbon group of 1 to 16 carbon atoms;
   each $R^2$ is independently a group as defined for $R^1$ or an acyl group;
   each $R^3$ is independently a monovalent organic group containing an aliphatic unsaturated hydrocarbon group;
   each $R^4$ is a monovalent organic group linked to the Si atom of the siloxane oligomer backbone by a Si—C bond that does not include an aliphatic unsaturated hydrocarbon group and that has thereon one or more members selected from the group consisting of ether polysulfide, ester, polyester, carbamate, polyurethane, isocyanurate, thioether, blocked mercaptan, amide, cyano, and oximato groups;
   with the provisos that at least one R is a B, at least one quarter of all R groups are —$OR^2$, and at least one silicon atom of the oligomer has an $R^3$ group thereon;
   m is 2 to 10;
   n is 0 to 20;
   o is 0 to 20; and
   p is 0 to 10.

2. The composition of claim 1 wherein the moisture curable polymer is a silylated polyurethane.

3. The composition of claim 1 further comprising a cure catalyst.

4. The composition of claim 1 further comprising at least one member selected from the group consisting of fillers, plasticizers, thixotropes, antioxidants, UV stabilizers, and adhesion promoters.

5. The composition of claim 1 further comprising at least one filler selected from the group consisting of fumed silica, precipitated silica, clay, carbon black, and calcium carbonates.

6. The composition of claim 1 wherein $R^1$ is selected from the group consisting of methyl, ethyl, i-propyl, i-butyl, t-butyl, pentyl, cyclohexyl, octyl, decyl, dodecyl, phenyl, benzyl, and naphthyl.

7. The composition of claim 1 wherein $R^2$ is selected from the group consisting of methyl, ethyl, i-propyl, i-butyl, t-butyl, pentyl, cyclohexyl, octyl, decyl, dodecyl, phenyl, benzyl, naphthyl, acetyl, benzoyl, and propionyl.

8. The composition of claim 1 wherein $R^3$ is selected from the group consisting of vinyl, allyl, propargyl, acryloxyalkyl, methacryloxyalkyl, crotyloxyalkyl, styryl, n-octenyl, linolyl, and linolenyl.

9. The composition of claim 1 wherein $m+n+o+p \leq 45$.

10. An article of manufacture comprising a cured composition prepared from an uncured composition comprising:
    A) a moisture curable polymer selected from the group consisting of silylated polyurethanes, silylated polyethers, and mixtures thereof; and
    B) a silicone oligomer of the formula:

$$[R_3SiO_{1/2}]_m[O_{1/2}Si(R)_2O_{1/2}]_n[SiO_{3/2}R]_o[SiO_{4/2}]_p \qquad (I)$$

wherein:
    each R is independently selected from the group consisting of B, $R^1$, —$OR^2$, $R^3$, and $R^4$;
    B is an organosilyl functional group bridged to the Si atom of the siloxane oligomer backbone by a Si—C bond;
    each $R^1$ is independently a saturated or aromatic hydrocarbon group of 1 to 16 carbon atoms;
    each $R^2$ is independently a group as defined for $R^1$ or an acyl group;
    each $R^3$ is independently a monovalent organic group containing an aliphatic unsaturated hydrocarbon group;
    each $R^4$ is a monovalent organic group linked to the Si atom of the siloxane oligomer backbone by a Si—C bond that does not include an aliphatic unsaturated hydrocarbon group and that has thereon one or more members selected from the group consisting of ether polysulfide, ester, polyester, carbamate, polyurethane, isocyanurate, thioether, blocked mercaptan, amide, cyano, and oximato groups;
    with the provisos that at least one R is a B, at least one quarter of all R groups are —$OR^2$, and at least one silicon atom of the oligomer has an $R^3$ group thereon;
    m is 2 to 10;
    n is 0 to 20;
    o is 0 to 20; and
    p is 0 to 10.

11. The article of claim 10 wherein the moisture curable polymer is a silylated polyurethane.

12. The article of claim 10 wherein the uncured composition further comprises a cure catalyst.

13. The article of claim 10 wherein the cured composition further comprises at least one member selected from the group consisting of fillers, plasticizers, thixotropes, antioxidants, UV stabilizers, and adhesion promoters.

14. The article of claim 10 wherein the cured composition further comprises at least one filler selected from the group consisting of fumed silica, precipitated silica, clay, carbon black, and calcium carbonates.

15. The article of claim 10 wherein $R^1$ is selected from the group consisting of methyl, ethyl, i-propyl, i-butyl, t-butyl, pentyl, cyclohexyl, octyl, decyl, dodecyl, phenyl, benzyl, and naphthyl.

16. The article of claim 10 wherein $R^2$ is selected from the group consisting of methyl, ethyl, i-propyl, i-butyl, t-butyl, pentyl, cyclohexyl, octyl, decyl, dodecyl, phenyl, benzyl, naphthyl, acetyl, benzoyl, and propionyl.

17. The article of claim 10 wherein $R^3$ is selected from the group consisting of vinyl, allyl, propargyl, acryloxyalkyl, methacryloxyalkyl, crotyloxyalkyl, styryl, n-octenyl, linolyl, and linolenyl.

18. The article of claim 10 wherein $m+n+o+p \leq 45$.

19. The article of claim 10 wherein said article is a sealant.

20. The article of claim 10 wherein said article is a coating.

21. The article of claim 10 wherein said article is an adhesive.

22. A method for the preparation of silylated polyurethanes comprising:

A) combining a silylated polyurethane prepolymer with a silicone oligomer of the formula:

$$[R_3SiO_{1/2}]_m[O_{1/2}Si(R)_2O_{1/2}]_n[SiO_{3/2}R]_o[SiO_{4/2}]_p \qquad (I)$$

wherein:

each R is independently selected from the group consisting of B, $R^1$, —$OR^2$, $R^3$, and $R^4$;

B is an organosilyl functional group bridged to the Si atom of the siloxane oligomer backbone by a Si—C bond;

each $R^1$ is independently a saturated or aromatic hydrocarbon group of 1 to 16 carbon atoms;

each $R^2$ is independently a group as defined for $R^1$ or an acyl group;

each $R^3$ is independently a monovalent organic group containing an aliphatic unsaturated hydrocarbon group;

each $R^4$ is a monovalent organic group linked to the Si atom of the siloxane oligomer backbone by a Si—C bond that does not include an aliphatic unsaturated hydrocarbon group and that has thereon one or more members selected from the group consisting of ether polysulfide, ester, polyester, carbamate, polyurethane, isocyanurate, thioether, blocked mercaptan, amide, cyano, and oximato groups;

with the provisos that at least one R is a B, at least one quarter of all R groups are —$OR^2$, and at least one silicon atom of the oligomer has an $R^3$ group thereon;

m is 2 to 10;

n is 0 to 20;

o is 0 to 20; and p is 0 to 10;

B) curing by exposure to moisture.

23. The method of claim 22 wherein the silylated polyurethane prepolymer is moisture curable.

24. The method of claim 22 wherein the silylated polyurethane prepolymer and the silicone oligomer are combined in the presence of a cure catalyst.

25. The method of claim 22 further comprising the step of adding at least one member selected from the group consisting of fillers, plasticizers, thixotropes, antioxidants, UV stabilizers, and adhesion promoters.

26. The method of claim 22 further comprising the step of adding at least one filler selected from the group consisting of fumed silica, precipitated silica, clay, carbon black, and calcium carbonates.

27. The method of claim 22 wherein $R^1$ is selected from the group consisting of methyl, ethyl, i-propyl, i-butyl, t-butyl, pentyl, cyclohexyl, octyl, decyl, dodecyl, phenyl, benzyl, and naphthyl.

28. The method of claim 22 wherein $R^2$ is selected from the group consisting of methyl, ethyl, i-propyl, i-butyl, t-butyl, pentyl, cyclohexyl, octyl, decyl, dodecyl, phenyl, benzyl, naphthyl, acetyl, benzoyl, and propionyl.

29. The method of claim 22 wherein $R^3$ is selected from the group consisting of vinyl, allyl, propargyl, acryloxyalkyl, methacryloxyalkyl, crotyloxyalkyl, styryl, n-octenyl, linolyl, and llinolenyl.

30. The method of claim 22 wherein $m+n+o+p \leq 45$.

* * * * *